(12) United States Patent
Kwon et al.

(10) Patent No.: US 9,123,965 B2
(45) Date of Patent: Sep. 1, 2015

(54) METHOD OF PREPARING NANO-SIZED CATALYST ON CARBON SUPPORT (75) Inventors: Nak Hyun Kwon, Seoul (KR); Inchul Hwang, Gyeonggi-do (KR); Jae Seung Lee, Gyeonggi-do (KR); Yung-Eun Sung, Gyeonggi-do (KR); Tae-Yeol Jeon, Seoul (KR); Sung Jong Yoo, Incheon (KR); Kug-Seung Lee, Gwangju (KR); Yong-Hun Cho, Gyeonggi-do (KR)

(73) Assignees: Hyundai Motor Company, Seoul (KR); SNU R&DB Foundation, Seoul (KR)

( * ) Notice: Subject to any disclaimer, the term of this patent is extended or adjusted under 35 U.S.C. 154(b) by 220 days.

(21) Appl. No.: 12/775,062

(22) Filed: May 6, 2010

(65) Prior Publication Data
US 2011/0104588 A1 May 5, 2011

(30) Foreign Application Priority Data

Oct. 29, 2009 (KR) ........................ 10-2009-0103747

(51) Int. Cl.
*H01M 4/92* (2006.01)
*H01M 4/88* (2006.01)
*H01M 4/86* (2006.01)

(52) U.S. Cl.
CPC ................ *H01M 4/92* (2013.01); *H01M 4/885* (2013.01); *H01M 4/926* (2013.01); *H01M 4/8663* (2013.01); *Y02E 60/50* (2013.01)

(58) Field of Classification Search
None
See application file for complete search history.

(56) References Cited

U.S. PATENT DOCUMENTS 7,335,245 B2   2/2008  He et al.
7,592,042 B1*  9/2009  Koike ........................ 427/215
8,080,139 B2* 12/2011  Zhong et al. ................ 203/19

FOREIGN PATENT DOCUMENTS

JP    2000-000467 A    1/2000
KR    10-2006-0030591 A    4/2006
KR    10-0823094    3/2008

OTHER PUBLICATIONS

Liu et al., "Synthesis and activation of Pt nanoparticles with controlled size for fuel cell electrocatalysts", Journal of Power Sources, pp. 472-480 (2006).
Liu et al., "Physical and electrochemical characterizations of PrPb/C catalyst prepared by pyrolysis of platinum(II) and lead(II) acetylacetonate", Journal of Power Sources, pp. 16-22 (2008).

* cited by examiner

*Primary Examiner* — Sarah A Slifka
(74) *Attorney, Agent, or Firm* — Mintz Levin Cohn Ferris Glovsky and Popeo, P.C.; Peter F. Corless (57) ABSTRACT The present invention provides a method of synthesizing a nano-sized transition metal catalyst on a carbon support, including dissolving a stabilizer in ethanol thus preparing a mixture solution, adding a support to the mixture solution thus preparing a dispersion solution, dissolving a transition metal precursor in ethanol thus preparing a precursor solution, mixing the precursor solution with the dispersion solution with stirring, and then performing reduction, thus preparing the nano-sized transition metal catalyst. This method enables the synthesis of transition metal nanoparticles supported on carbon powder having a narrow particle size distribution and a wide degree of dispersion through a simple process, and is thus usefully applied to the formation of an electrode material or the like of a fuel cell.

6 Claims, 9 Drawing Sheets

METHOD OF PREPARING NANO-SIZED CATALYST ON CARBON SUPPORT

CROSS-REFERENCE TO RELATED APPLICATION

This application claims under 35 U.S.C. §119(a) the benefit of Korean Patent Application No. 10-2009-0103747 filed Oct. 29, 2009, the entire contents of which are incorporated herein by reference.

BACKGROUND (a) Technical Field

The present disclosure relates to a method of preparing a nano-sized transition metal catalyst in a carbon support, which can be used as an electrode material or the like of a fuel cell.

(b) Background Art

Fuel cells directly convert chemical energy produced by oxidation of fuel into electrical energy, thereby improving fuel economy, reducing emission and providing environmentally friendly properties in automobile-related field.

A proton exchange membrane fuel cell (PEMFC) and a direct methanol fuel cell (DMFC), which are typical fuel cells, include a catalyst material resulting from dispersing transition metal nanoparticles containing platinum as an electrode material on a carbon support. However, because platinum is expensive and rare, researches have been conducted to reduce the amount of platinum or replace platinum with a less expensive or cheap metal.

In the case where platinum is applied only on the surface layer of nanoparticles, the electronic energy level of surface platinum atoms is lowered. Thereby, the problem of the fuel cell with increased oxygen reduction overvoltage may be solved, as was reported in recent research (Stamenkovic, V. R. etc., Science, vol. 315, p. 493). Thus, in the application of platinum only on the surface layer of nanoparticles, there are required various methods of synthesizing metal nanoparticles supported on carbon powder having a narrow particle size distribution and a high degree of dispersion as a core material.

Examples of the transition metal usable as the electrode material of the fuel cell include 4d transition metals (Ru, Rh, Pd) and 5d transition metals (Os, Ir, Pt). A method of preparing nanoparticles of binary or ternary alloys, as well as the above single metal, is traditionally based on a borohydride reduction method. Although the borohydride reduction method using water as a solvent is advantageous because of the simplicity of the process, it is problematic in that the nanoparticles present on the surface of the carbon support may agglomerate severely, and in some cases, the nanoparticles may not be formed on the surface of the carbon support. In the case where platinum is reduced along with another metal, the synthesis results are reported to be comparatively good, which is considered to be due to the high reduction potential of platinum.

Another method to prepare nanoparticles is a polyol method. This method, which is typically used to prepare platinum or ruthenium nanoparticles, includes applying heat to an alcohol solvent such as ethylene glycol or propylene-1, 2-glycol thereby causing a dehydrogenation reaction so that the dissolved metal precursor is reduced. However, this method is disadvantageous because the added metal precursor is difficult to be completely reduced or nanoparticles having a large amount of oxide in lieu of pure metal are frequently prepared due to the use of sodium hydroxide (NaOH) as an additive, which may deteriorate electrochemical activity.

In addition, a method of using ethanol as a solvent and sodium borohydride ($NaBH_4$) as a reducing agent to preparing transition metal nanoparticles supported on the surface of carbon powder is known (U.S. Pat. No. 7,335,245, Korean Patent No. 10-823094, Japanese Unexamined Patent Publication No. 2000-000467), but this method is not suitable for industrial mass production as it requires high amount of energy for the reduction process.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a method of synthesizing a nano-sized transition metal catalyst, in which a stabilizer is dissolved in ethanol to prepare a mixture solution; a support is added to the mixture solution and stirred to prepare a dispersion solution; a transition metal precursor is dissolved in ethanol to prepare a precursor solution and the precursor solution is mixed with the dispersion solution with stirring to prepare a dispersed precursor solution; the dispersed precursor solution is reduced to prepare nanoparticles; the nanoparticles are washed and dried to obtaining a powder thereof.

The above and other features of the invention are discussed below.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale and present a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, similar reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention pertains to a method of synthesizing a nano-sized transition metal catalyst, including (a) dissolving a stabilizer in ethanol to prepare a mixture solution, (b) adding a support to the mixture solution with stirring to prepare a dispersion solution, (c) dissolving a transition metal precursor in ethanol to prepare a precursor solution and then mixing the precursor solution with the dispersion solution with stirring to prepare a dispersed precursor solution, (d) reducing the dispersed precursor solution to prepare nanoparticles and (e) washing and drying the nanoparticles to obtain the nanoparticles as a powder.

Specifically, in step (a), ethanol is used to dissolve the stabilizer since it is advantageous because it can dissolve any type of solute, like water. In the case where the metal precursor contains water, ethanol mixes well with water and thus may effectively remove water from the metal precursor. Preferably, ethanol having low water content enables the preparation of a catalyst material containing single nanoparticles having a narrow particle size distribution and/or alloy nanoparticles having a high percentage of alloy. Preferably, anhydrous ethanol may be used to dissolve the stabilizer. The term "anhydrous ethanol" used herein refer to ethanol containing about 0.01~0.1% of water.

The stabilizer is added to 100~800 ml of ethanol per 0.1 g of metal, stirred and thus uniformly dissolved. If the amount of ethanol is less than 100 ml per 0.1 g of metal, aggregation of nanoparticles upon reduction occurs, undesirably causing the nanoparticles to disperse poorly. In contrast, if the amount thereof exceeds 800 ml, problems of the transition metal not being reduced may occur. In the present invention, the mixture solution of the reaction system may further include an excess of ethanol in order to mitigate drastic changes in the reaction conditions upon reduction. As such, the amount of ethanol in the mixture solution is determined in consideration of changes in the total volume of the solution of the reaction system after addition of a reducing agent. The amount of the mixture solution is set to 1/10~1/5 of the total volume of the solution of the reaction system after addition of the reducing agent. If the amount of ethanol in the mixture solution of the reaction system is insufficient, in the course of mixing of a reducing agent, the reducing agent which is strong may reduce a predetermined proportion of metal precursor before being mixed with stirring, thus widening the particle size distribution of nanoparticles. Furthermore, as the amount of solvent is increased, the distance between the metal precursor and the support is increased, so that the formation of crystal core of nanoparticles does not occur on the surface of carbon. Hence, upon growth of particles after formation of the crystal core in the solvent, precipitation occurs due to electrostatic attractive force of the surface of the support, and undesirable agglomeration of the particles may become severe.

In the present invention, the stabilizer may include oleylamine, cetyltrimethylammonium bromide (CTAB), cetyltrimethylammonium chloride (CTAC), tributylammonium chloride (TBAC), trioctylammonium bromide (TOAB), and any combination thereof. The kind of the stabilizer may be determined depending on the kind of metal used and/or the kind of solvent used. For example, whereas oleylamine is not dissolved in water but is dissolved well in ethanol, CTAB is dissolved in water and shows higher solubility in ethanol. The appropriate amount of stabilizer varies slightly depending on the kind of transition metal, and a detailed illustration thereof is shown in Table 1 below.

TABLE 1

| | | Oleylamine (mol/metal mol) | CTAB (mol/metal mol) |
|---|---|---|---|
| 4d Transition Metal | Ruthenium | 0.25~0.5 | — |
| | Rhodium | 0.25~0.5 | — |
| | Palladium | 0.5~1.5 | — |
| 5d Transition Metal | Osmium | 0.25~2.0 | — |
| | Iridium | — | 0.25~1.0 |
| | Platinum | — | 10~30 |

In step (b), an appropriate amount of the support is added and stirred. If desired, sonication may be performed in addition to stirring. When sonication is performed, in some cases, local hot spots in the solution may be generated to cause the temperature of the solution to increase, which can result in reduction of the metal precursor. Hence, the sonicated solution is, preferably, stirred at room temperature, thereby cooling the temperature of the solution to room temperature. Examples of the support may include, but not limited to, carbon powder, carbon black, acetylene black, Ketjen black, activated carbon, carbon nanotubes, carbon nanofibers, carbon nanowires, carbon nanohorns, carbon aerogel, carbon xerogel and carbon nanorings.

In the step (c), the transition metal precursor solution is prepared by dissolving the metal precursor in ethanol (preferably, anhydrous ethanol). Non-limiting examples of the metal precursor may include $RuCl_3$, $RhCl_3$, $Pd(NO_3)_2$, $OsCl_3$, $IrCl_3$, and $PtCl_4$. The amount of transition metal may be set, preferably, to 5~90 wt % based on the total amount of the nano-sized transition metal catalyst. The amount of the solvent, ethanol, is set to 100~800 ml per 0.1 g of metal. As such, if the amount of ethanol is less than 100 ml, aggregation of nanoparticles may occur upon reduction, so that the nanoparticles are not dispersed well. In contrast, if the amount of ethanol exceeds 800 ml, the transition metal may not be reduced. The transition metal precursor solution may be added to the solution prepared in the step (b), and stirred for an appropriate period of time, preferably 2 hours or longer, depending on the kind of metal.

Before addition of the reducing agent, sonication may be performed for 1~5 min depending on the kind of metal. This is to prevent the precipitation and agglomeration of the support in ethanol, and to prevent the reduction of the metal precursor through short sonication. Furthermore, after sonication, the reducing agent is added as quickly as possible so that the subsequent reduction step (d) is performed.

In the step (d), sodium borohydride ($NaBH_4$) is dissolved in ethanol and then added to the solution prepared in the step (c) within a short time with vigorous stirring, so that sodium borohydride is uniformly mixed in the solution within a short time to reduce the metal precursor. The amount of ethanol used as the solvent is preferably set to 1/5~1/10 of the total volume of the solution of the reaction system. This is to prevent the widening of the particle size distribution of nanoparticles or the agglomeration of the particles as mentioned above. Sodium borohydride as the reducing agent is used in an amount of 5~15 equivalents based on the amount of tetravalent platinum in consideration of the oxidation state of metal. The term "equivalent" is used herein such that 1 equivalent indicates 1 mol of sodium borohydride able to reduce 1 mol of tetravalent platinum. If the amount of sodium borohydride is less than 5 equivalents, the problem of the transition metal not being reduced may occur. In contrast, if the amount of sodium borohydride exceeds 15 equivalents, the nanoparticles may undesirably agglomerate. The period of time required to complete the reduction using sodium borohydride is preferably set to 2 hours or longer. Although the borohydride reduction in an ethanol solvent varies depending on the kind of metal, it is reported that the reduction is completed after 2 hours at a maximum.

In the step (e), the stabilizer is eliminated by washing and drying followed by performing filtering and washing using acetone and then ethanol. After washing with ethanol, final washing using deionized water may be additionally performed. When the nanoparticles come into contact with water in the course of washing after reduction in the organic solvent, the surface oxidation of nanoparticles and the agglomeration of the particles may occur, in which such great changes may be detected upon measurement using an X-ray diffraction device. Thus, in the case where the prepared nanoparticles should be subjected to an additional process, washing using water is not preferable. After washing, drying is performed in a vacuum oven in an argon atmosphere, thereby obtaining an electrode material in powder phase.

According to the present invention, it is possible to synthesize nanoparticles using reduction of transition metals in which at least half the valence d-band is filled with electrons and a standard reduction potential is 0 V or more, in the transition metal region of the periodic table. The supported metal nanoparticles typically include single metal and/or alloy nanoparticles to serve as the electrode material of the fuel cell. The alloy nanoparticles may include for example platinum or palladium alloy.

EXAMPLES

The following examples illustrate the invention and are not intended to limit the same.

Example 1

Synthesis of Nano-Sized 40 Wt % Ru/C Catalyst

A nano-sized ruthenium (Ru/C) catalyst containing 40 wt % metal was synthesized using the method according to the present invention, as described below.

80 µl of oleylamine ($C_{18}H_{35}NH_2$, TCI) was added to 120 ml of anhydrous ethanol (water content of 1% or less), and then stirred for 30 min. Thereafter, 0.15 g of a carbon support (Cabot, Vulcan XC-72R) was added thereto, followed by performing stirring for 30 min, sonication for 30 min and then stirring for 30 min. Thereafter, 0.2498 g (0.15 g of carbon, 40 wt % supporting) of a ruthenium precursor ($RuCl_3 \cdot xH_2O$) was dissolved in 60 ml of anhydrous ethanol, added to the solution containing the carbon support with stirring, and then stirred for about 12 hours or longer. The solution thus obtained was finally reduced. To this end, 5 equivalents (about 5 times the mol of ruthenium) of sodium borohydride ($NaBH_4$, about 0.19 g) was dissolved in 20 ml of anhydrous ethanol, and then added at once to the above solution with vigorous stirring, after which vigorous stirring was performed for 30 min. Thereafter, the stirring rate was lowered appropriately and maintained for 1.5 hours, followed by performing filtering and washing using 100 ml of acetone and 300 ml of ethanol, after which drying was carried out in a vacuum oven at 40° C. for about 6 hours or longer, thereby obtaining a nano-sized catalyst.

Figure 1:
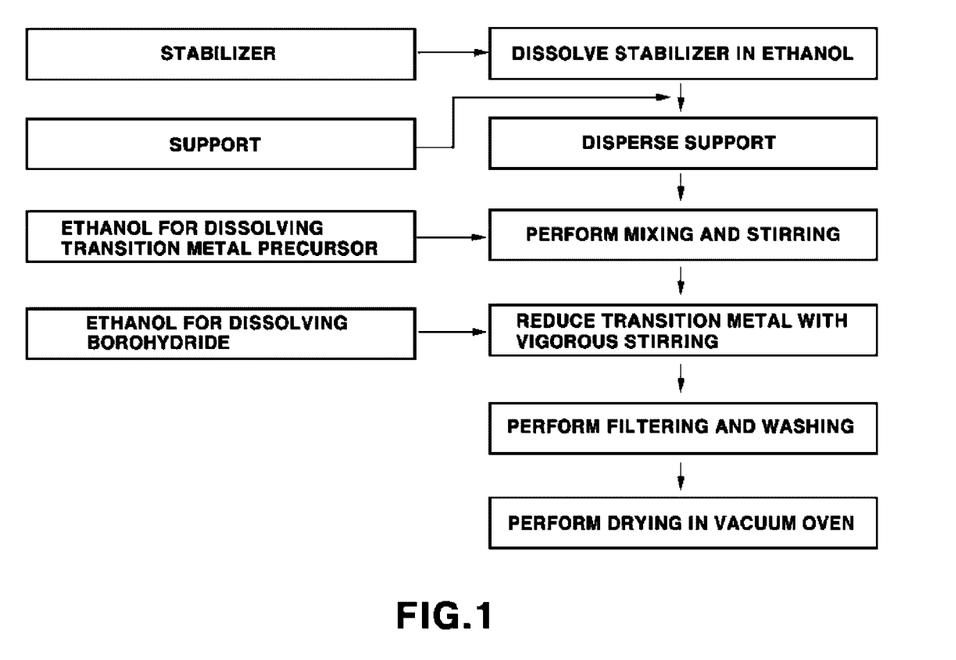
FIG. 1 is a flowchart showing synthesis of transition metal nanoparticles.
Figure 2:
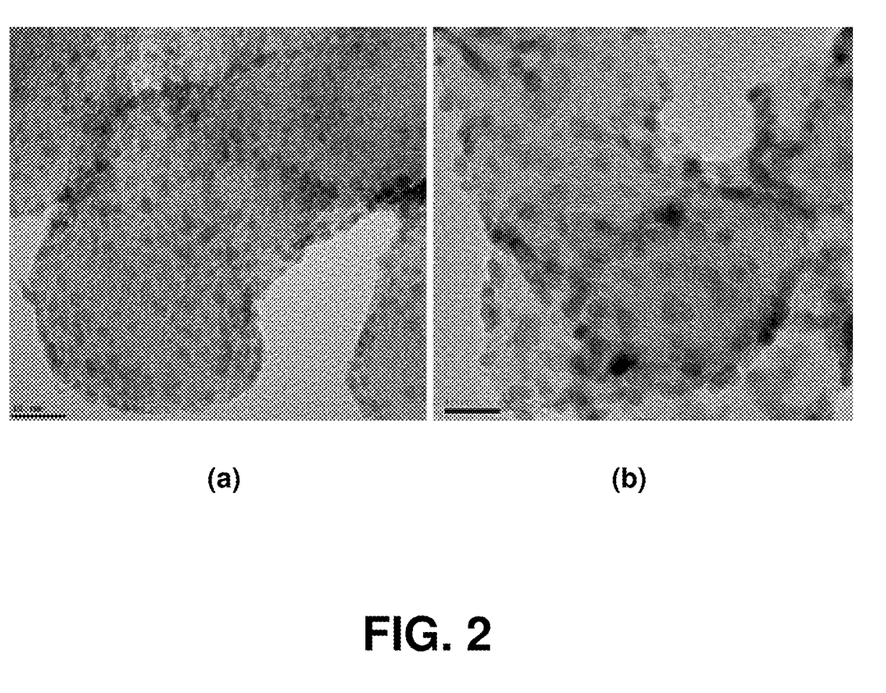
FIG. 2 shows a transmission electron microscope (TEM) image of 40 wt % ruthenium (Ru) nanoparticles supported on carbon black.

FIG. 2A is a TEM image showing the size and shape of the material prepared in Example 1. As shown in this drawing, the particle size of the ruthenium nanoparticles is about 3 nm and the particle distribution is a substantially uniform despite a very narrow distance between the particles. In addition, FIG. 2B is a TEM image showing the ruthenium nanoparticles which are heat treated at 300° C. for 1 hour in a gas mixture atmosphere of 5 vol % of hydrogen and 95 vol % of argon. As shown in this drawing, the size of the nanoparticles is increased to 4~7 nm through heat treatment. Without intending to limit the theory, this is considered to result from sintering of the nanoparticles.

Figure 3:
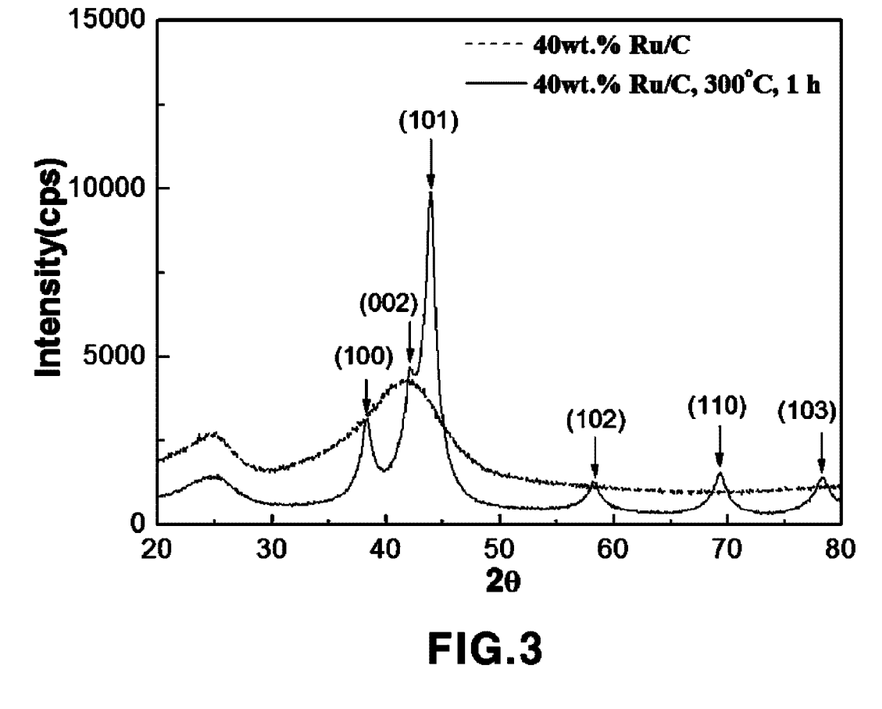
FIG. 3 shows an X-ray diffraction pattern of 40 wt % Ru nanoparticles supported on carbon black.

FIG. 3 shows an X-ray diffraction patterns of the nano-sized ruthenium catalyst prepared in Example 1. The powder diffraction pattern of the ruthenium nanoparticles of FIG. 2A has an indistinct diffraction peak depending on the crystal plane and a very wide full width at half maximum (FWHM) of the peak. While not limiting the theory, this is considered to be due to the entropy caused by forming crystal lattices in the course of reducing the ionic metal at room temperature for a short time using the reducing agent, and also due to oxidation based on contact with air. In the case where such nanoparticles are treated at 300° C. for 1 hour in a gas mixture atmosphere of 5 vol % of hydrogen and 95 vol % of argon, definite ruthenium crystal peaks such as a pattern represented by the continuous line of FIG. 3 are shown. Hence, it is confirmed that the highly dispersed and supported ruthenium nanoparticles was formed very well by performing the method according to the present invention.

Example 2

Synthesis of Nano-Sized 40 Wt % Pd/C Catalyst

A nano-sized 40 wt % palladium (Pd/C) catalyst was synthesized using the same procedures as in Example 1. This synthesis process was the same as the preparation process of Ru/C, with the exceptions of the amount of the stabilizer and the kind of palladium precursor. The stabilizer was oleylamine, and the amount thereof was set to the same mol as that of the palladium. In the present embodiment, about 300 µl of the stabilizer was used. The palladium precursor was $Pd(NO_3)_2$ hydride, and sodium borohydride was used in an amount of about 0.18 g corresponding to 5 equivalents of palladium.

Figure 4:
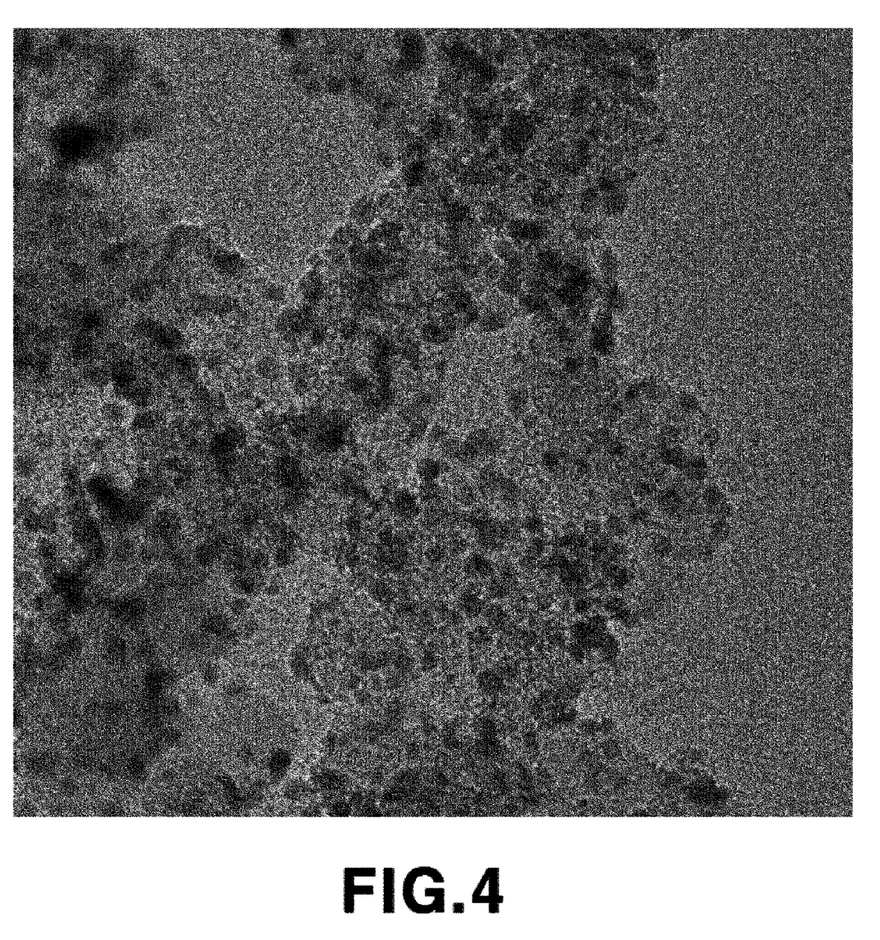
FIG. 4 shows a TEM image of 40 wt % palladium (Pd) nanoparticles supported on carbon black.

FIG. 4 is a TEM image of the nano-sized palladium catalyst prepared in Example 2. The nanoparticles has an average particle size of about 3.5 nm and show a superior particle distribution.

Figure 5:
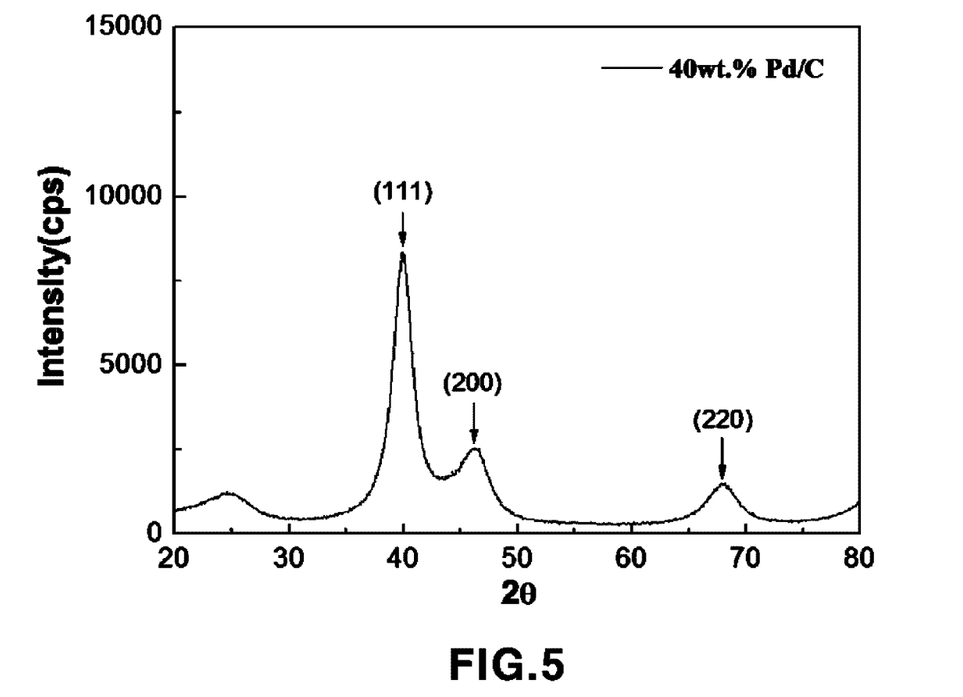
FIG. 5 shows an X-ray diffraction pattern of 40 wt % Pd nanoparticles supported on carbon black.

FIG. 5 is an X-ray diffraction pattern of the nano-sized palladium catalyst prepared in Example 2. The crystal peaks of palladium are definitely observed and the FWHM of the peak is wide, from which the formation of the palladium nanoparticles can be confirmed again.

Example 3

Synthesis of Nano-Sized 40 Wt % Ir/C Catalyst

A nano-sized 40 wt % iridium (Ir/C) catalyst was synthesized using the same procedures as in Example 1. This synthesis process was the same as the preparation process of Ru/C, with the exceptions of the amount of the stabilizer and the kind of iridium precursor. The stabilizer was CTAB ($C_{19}H_{42}BrN$, TCl), and the amount thereof was set to about 0.095 g corresponding to 0.5 times the mol of iridium. The iridium precursor was $IrCl_3$ hydride.

Figure 6:
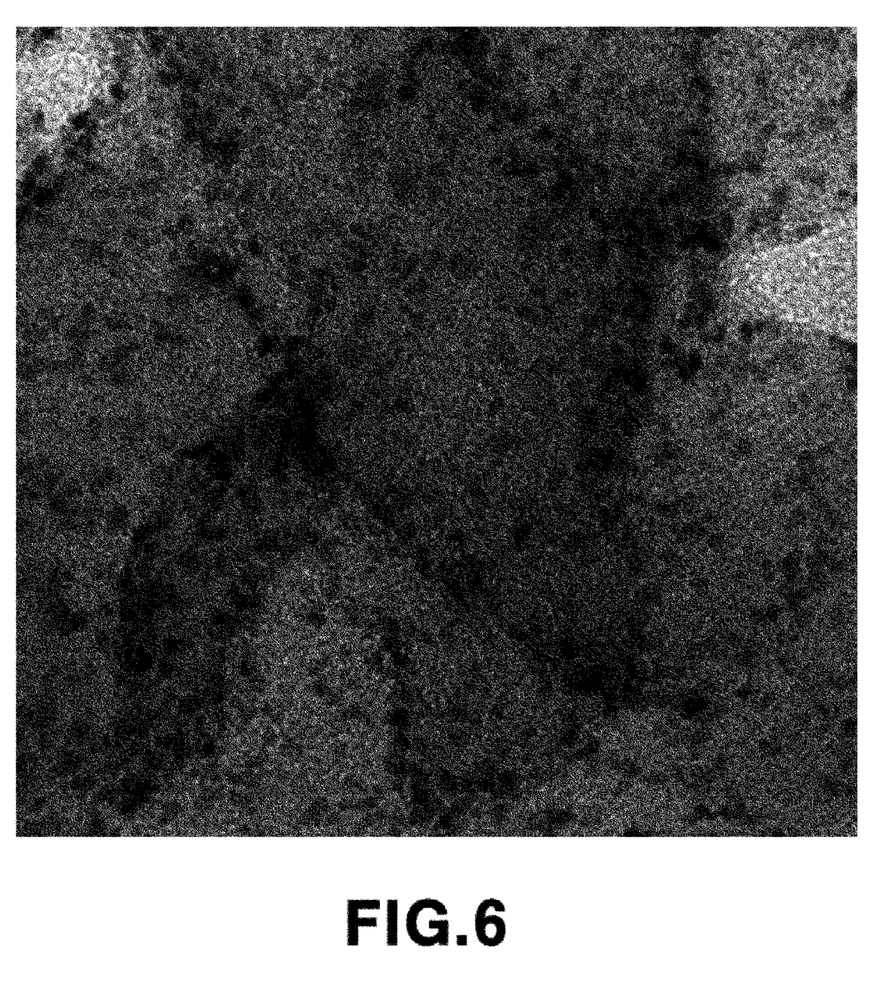
FIG. 6 shows a TEM image of 40 wt % iridium (Ir) nanoparticles supported on carbon black.

FIG. 6 is a TEM image of the nano-sized iridium catalyst prepared in Example 3. The iridium nanoparticles has an average particle size of about 2 nm and show a superior particle distribution. Despite the supporting of about 40% iridium based on the total weight of the catalyst including carbon, a superior particle distribution is shown.

Figure 7:
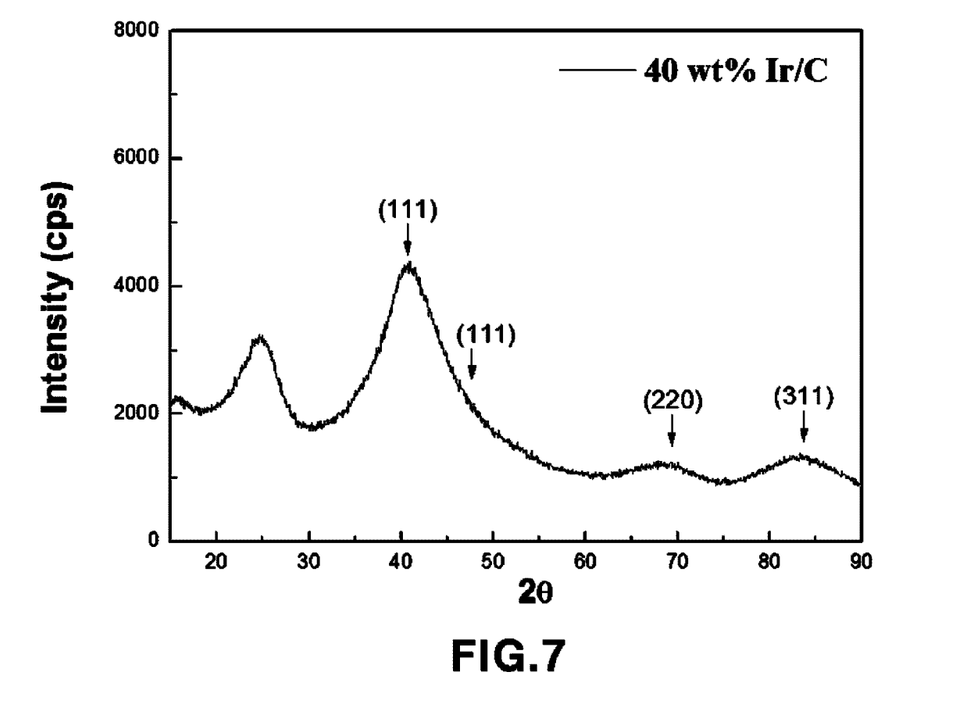
FIG. 7 shows an X-ray diffraction pattern of 40 wt % Ir nanoparticles supported on carbon black.

FIG. 7 is an X-ray diffraction pattern of the nano-sized iridium catalyst prepared in Example 3. As is apparent from the drawing, the FWHM of the peak is very wide. Without intending to limit the theory, this is considered to be due to the entropy of the crystal structure through reduction at room temperature because the particle size is as small as 2 nm or less and the melting point is very high at 2410° C., as shown in the TEM image of FIG. 6. In the case where heat treatment is performed as in the case of Ru/C of Example 1, it is expected to definitely show the peak depending on the crystal plane.

Example 4

Synthesis of Nano-Sized 20 Wt % Pt/C Catalyst

Figure 8:
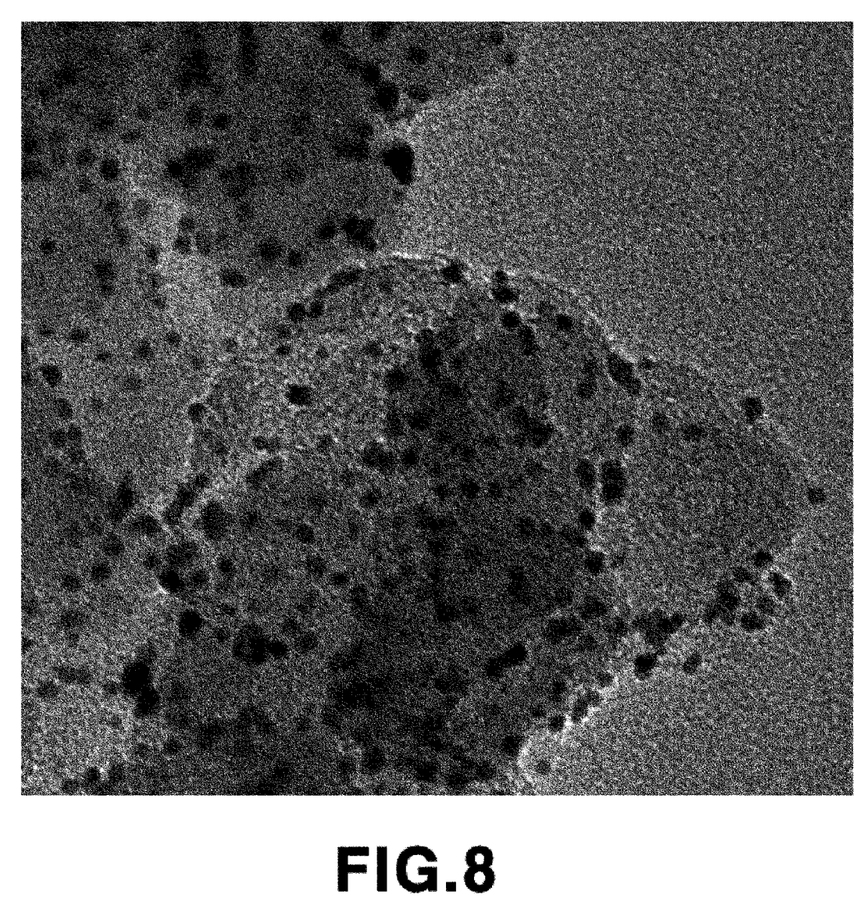
FIG. 8 shows a TEM image of 20 wt % platinum (Pt) nanoparticles supported on carbon black.

This synthesis process was the same as in Example 3, and the stabilizer was CTAB and the platinum precursor was $PtCl_4$. The amount of stabilizer was set to about 1.4 g corresponding to 20 times the mol of platinum. The reason why the stabilizer should be used in an amount as large as 20 times when using platinum as compared to when using another transition metal is that a great amount of the stabilizer is required in the case of a metal such as platinum in which agglomeration of nanoparticles is severe in the course of reduction. In the case where CTAB which manifests a low degree of stabilization of platinum particles is used in an amount as large as about 20 times the amount of platinum, it may perform two stabilization functions including charge stabilization and steric stabilization, so that a very superior particle distribution can be ensured as shown in FIG. 8. The amount of stabilizer is regarded as appropriate when set to 10~30 times the mol of platinum from the test results mentioned above.

FIG. 8 is a TEM image showing an average particle size of about 3 nm and a superior particle distribution.

Figure 9:
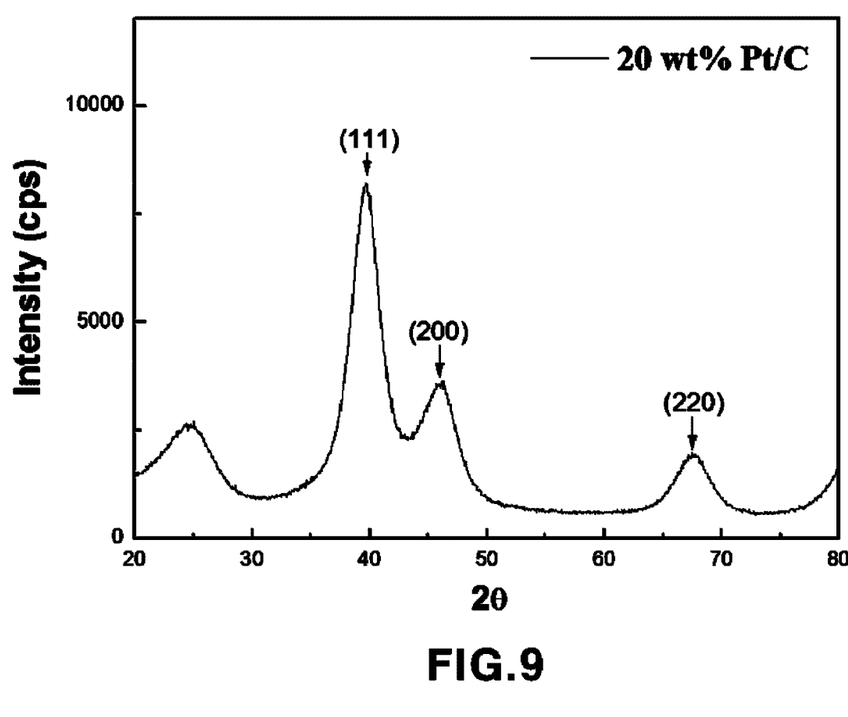
FIG. 9 shows an X-ray diffraction pattern of 20 wt % Pt nanoparticles supported on carbon black.

FIG. 9 is an X-ray diffraction pattern of the nano-sized platinum catalyst prepared in Example 4. As shown in this drawing, it is confirmed that the platinum nanoparticles were prepared well from the peaks depending on respective crystal planes.

As described hereinbefore, the present invention provides a method of synthesizing a nano-sized transition metal catalyst on a carbon support. The method according to the present invention enables the synthesis of nanoparticles having a narrow particle size distribution through a simple process. The nano-sized transition metal catalyst thus synthesized can be usefully applied to an electrode material or the like of a fuel cell.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of synthesizing a nano-sized transition metal catalyst, comprising:
   dissolving cetyltrimethylammonium bromide as a stabilizer in ethanol to prepare a mixture solution;
   adding a support to the mixture solution to prepare a dispersion solution;
   dissolving a transition metal precursor comprising Ir in ethanol to prepare a precursor solution and mixing the precursor solution with the dispersion solution to prepare a dispersed precursor solution; and
   reducing the dispersed precursor solution using $NaBH_4$ as a reducing agent to prepare nanoparticles,
   wherein cetyltrimethylammonium bromide is present in a molar ratio relative to transition metal precursor comprising iridium of from about 0.25 to about 1.0.

2. The method of claim 1, wherein the ethanol is anhydrous ethanol.

3. The method of claim 1 further comprising washing and drying the nanoparticles to obtain the nanoparticles as a powder.

4. A method of synthesizing a nano-sized transition metal catalyst, comprising: dissolving cetyltrimethylammonium bromide as a stabilizer in ethanol to prepare a mixture solution;
   adding a support to the mixture solution to prepare a dispersion solution;
   dissolving a transition metal precursor comprising Pt in ethanol to prepare a precursor solution and mixing the precursor solution with the dispersion solution to prepare a dispersed precursor solution; and
   reducing the dispersed precursor solution using $NaBH_4$ as a reducing agent to prepare nanoparticles,
   wherein cetyltrimethylammonium bromide is present in a molar ratio relative to transition metal precursor comprising platinum of from about 10 to about 30.

5. The method of claim 4, wherein the ethanol is anhydrous ethanol.

6. The method of claim 4, further comprising washing and drying the nanoparticles to obtain the nanoparticles as a powder.

* * * * *